US012206147B2

(12) United States Patent
Uemichi

(10) Patent No.: US 12,206,147 B2
(45) Date of Patent: Jan. 21, 2025

(54) DIGITAL PHASE SHIFTER

(71) Applicant: Fujikura Ltd., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/922,819

(22) PCT Filed: Aug. 8, 2022

(86) PCT No.: PCT/JP2022/030249
§ 371 (c)(1),
(2) Date: Nov. 2, 2022

(87) PCT Pub. No.: WO2023/181447
PCT Pub. Date: Sep. 28, 2023

(65) Prior Publication Data

US 2024/0222829 A1 Jul. 4, 2024

(30) Foreign Application Priority Data

Mar. 22, 2022 (JP) ................................ 2022-046071

(51) Int. Cl.
*H01P 1/18* (2006.01)

(52) U.S. Cl.
CPC ................ *H01P 1/18* (2013.01); *H01P 1/184* (2013.01)

(58) Field of Classification Search
CPC .. H01P 1/18; H01P 1/184; H01P 1/185; H01P 1/182; H01P 9/00; H03H 11/26;
(Continued)

(56) References Cited

U.S. PATENT DOCUMENTS 6,816,031 B1 11/2004 Miller
2019/0158068 A1 5/2019 Valdes Garcia et al.
(Continued)

FOREIGN PATENT DOCUMENTS

CN 106785250 A 5/2017
CN 109616723 A 4/2019
(Continued)

OTHER PUBLICATIONS

International Search Report dated Oct. 4, 2022, issued in counterpart International Application No. PCT/JP2022/030249.
(Continued)

*Primary Examiner* — Stephen E. Jones
(74) *Attorney, Agent, or Firm* — WHDA, LLP

(57) ABSTRACT

A digital phase shifter of the present invention is a digital phase shifter in which digital phase shift circuits are cascade-connected, each of the digital phase shift circuits including a signal line, a pair of inner lines provided on both sides of the signal line, a pair of outer lines provided on outer sides of the inner lines, a first ground conductor connected to one ends of the inner lines and one ends of the outer lines, a second ground conductor connected to the other ends of the outer lines, and a pair of electronic switches provided between the other ends of the inner lines and the second ground conductor. The digital phase shift circuits include a multi-row structure constituted by a front row and a rear row, the front row and the rear row are adjacent to each other, and the ground pattern is connected to the front row at one point.

7 Claims, 5 Drawing Sheets

(58) Field of Classification Search
CPC ...... H03H 11/265; H03H 11/16; H03H 11/20; H03H 11/18; H03H 17/0009; H03H 17/08; H03K 2005/00286
See application file for complete search history.

(56) References Cited

U.S. PATENT DOCUMENTS

| | | | | |
|---|---|---|---|---|
| 2021/0344112 | A1 | 11/2021 | Cercelaru et al. | |
| 2023/0170851 | A1 * | 6/2023 | Waks | H01P 1/227<br>330/149 |

FOREIGN PATENT DOCUMENTS

| | | | |
|---|---|---|---|
| CN | 111326839 | A | 6/2020 |
| JP | 2011-259215 | A | 12/2011 |
| JP | 2016-158035 | A | 9/2016 |

OTHER PUBLICATIONS

Y. Tousi et al., A Ka-band Digitally-Controlled Phase Shifter with sub-degree Phase Precision (2016, IEEE, RFIC), RTU2C-5; cited in specification.

* cited by examiner

DIGITAL PHASE SHIFTER

TECHNICAL FIELD

The present invention relates to a digital phase shifter.

Priority is claimed on Japanese Patent Application No. 2022-046071, filed Mar. 22, 2022, the content of which is incorporated herein by reference.

BACKGROUND ART

Non Patent Document 1, which are described below, discloses digital control type phase shift circuits (digital phase shift circuits) that use microwaves, sub-millimeter waves, millimeter waves, or the like. As shown in FIG. 2 of Non Patent Document 1, the digital phase shift circuit includes a signal line, a pair of inner lines provided on both sides of the signal line, a pair of outer lines provided on outer sides of the pair of inner lines, a first ground bar connected to one ends of the pair of inner lines and the pair of outer lines, a second ground bar connected to the other ends of the pair of outer lines, a pair of NMOS switches provided between the other ends of a pair of inner lines and the second ground bar, and the like.

Such a digital phase shift circuit switches an operation mode between a low delay mode and a high delay mode by switching a return current flowing through the pair of inner lines or the pair of outer lines due to transmission of a signal wave in the signal line according to opening/closing of the pair of NMOS switches. That is, in the digital phase shift circuit, an operation mode is the low delay mode when the return current flows through the pair of inner lines, and an operation mode is the high delay mode when a return current flows through the pair of outer lines.

RELATED ART DOCUMENTS

Non Patent Document

[Non Patent Document 1]

A Ka-band Digitally-Controlled Phase Shifter with sub-degree Phase Precision (2016, IEEE, RFIC)

SUMMARY OF INVENTION

Problem to be Solved by the Invention

Incidentally, the digital phase shift circuit is applied to a base station or the like using, for example, a phased array antenna, and the digital phase shift circuits are mounted on a semiconductor substrate in a state in which they are cascade-connected actually. That is, the digital phase shift circuit is a unit in the configuration of the actual phase shifter, and a digital phase shifter is configured as dozens of digital phase shift circuits being cascade-connected to constitute each stage. The digital phase shifter realizes a plurality of phase shift quantities as a whole by setting a unit of each stage to the low delay mode or the high delay mode.

When such a digital phase shifter is mounted on the semiconductor substrate, digital phase shift circuits (units) may be disposed in a multi-row state due to restriction of a mounting space or the like. Then, in the digital phase shifter of the above-mentioned multi-row structure, when a ground pattern of another circuit may be connected to a grounded line, i.e., the two outer lines neighboring between the rows, the first ground bar and the second ground bar neighboring between the rows, or the like. There is a problem in which connection of such a ground pattern to the digital phase shifter may reduce a phase shift quantity of the digital phase shift circuit.

In consideration of the above-mentioned circumstances, the present invention is directed to providing a digital phase shifter capable of suppressing reduction in phase shift quantity of a digital phase shift circuit due to connection of a ground pattern of another circuit.

Means for Solving the Problem

In order to achieve the aforementioned objects, as a first solving means, a digital phase shifter of the present invention is a digital phase shifter in which digital phase shift circuits are cascade-connected, each of the digital phase shift circuits including at least a signal line, a pair of inner lines provided on both sides of the signal line, a pair of outer lines provided on outer sides of the inner lines, a first ground conductor connected to one ends of the inner lines and one ends of the outer lines, a second ground conductor connected to the other ends of the outer lines, and a pair of electronic switches provided between the other ends of the inner lines and the second ground conductor, the digital phase shift circuits including a multi-row structure constituted by a front row and a rear row connected through a predetermined connection circuit, and also including a structure in which the front row and the rear row are adjacent to each other, and the outer line in the front row is connected to a predetermined ground pattern, and the ground pattern being connected to the front row at one point.

As a second solving means according to the digital phase shifter of the present invention, in the first solving means, the ground pattern may be connected to a front end of the front row.

As a third solving means according to the digital phase shifter of the present invention, in the first solving means, the ground pattern may be positioned in a region between the front row and the rear row adjacent to each other, and the ground pattern may be connected to a rear end of the front row at one point.

As a fourth solving means according to the digital phase shifter of the present invention, in any one of the first to third solving means, the digital phase shift circuit may be constituted by conductive layers, and the ground pattern may be one layer of the conductive layers.

As a fifth solving means according to the digital phase shifter of the present invention, in any one of the first to third solving means, the digital phase shift circuit may be constituted by conductive layers, and the ground pattern may be a conductive layer different from the conductive layers.

As a sixth solving means according to the digital phase shifter of the present invention, in any one of the first to fifth solving means, the digital phase shift circuit may include a capacitor including an upper electrode connected to the signal line and a lower electrode connected to at least one of the first ground conductor and the second ground conductor.

As a seventh solving means according to the digital phase shifter of the present invention, in the sixth solving means, the digital phase shift circuit may further include an electronic switch for the capacitor between the lower electrode of the capacitor and at least one of the first ground conductor and the second ground conductor.

Effects of the Invention

According to the present invention, it is possible to provide a digital phase shifter capable of suppressing a variation in phase shift quantity of a digital phase shift circuit due to connection of a ground pattern of another circuit.

EMBODIMENTS FOR CARRYING OUT THE INVENTION

Hereinafter, an embodiment of the present invention are described with reference the accompanying drawings.

First Embodiment

Figure 1:
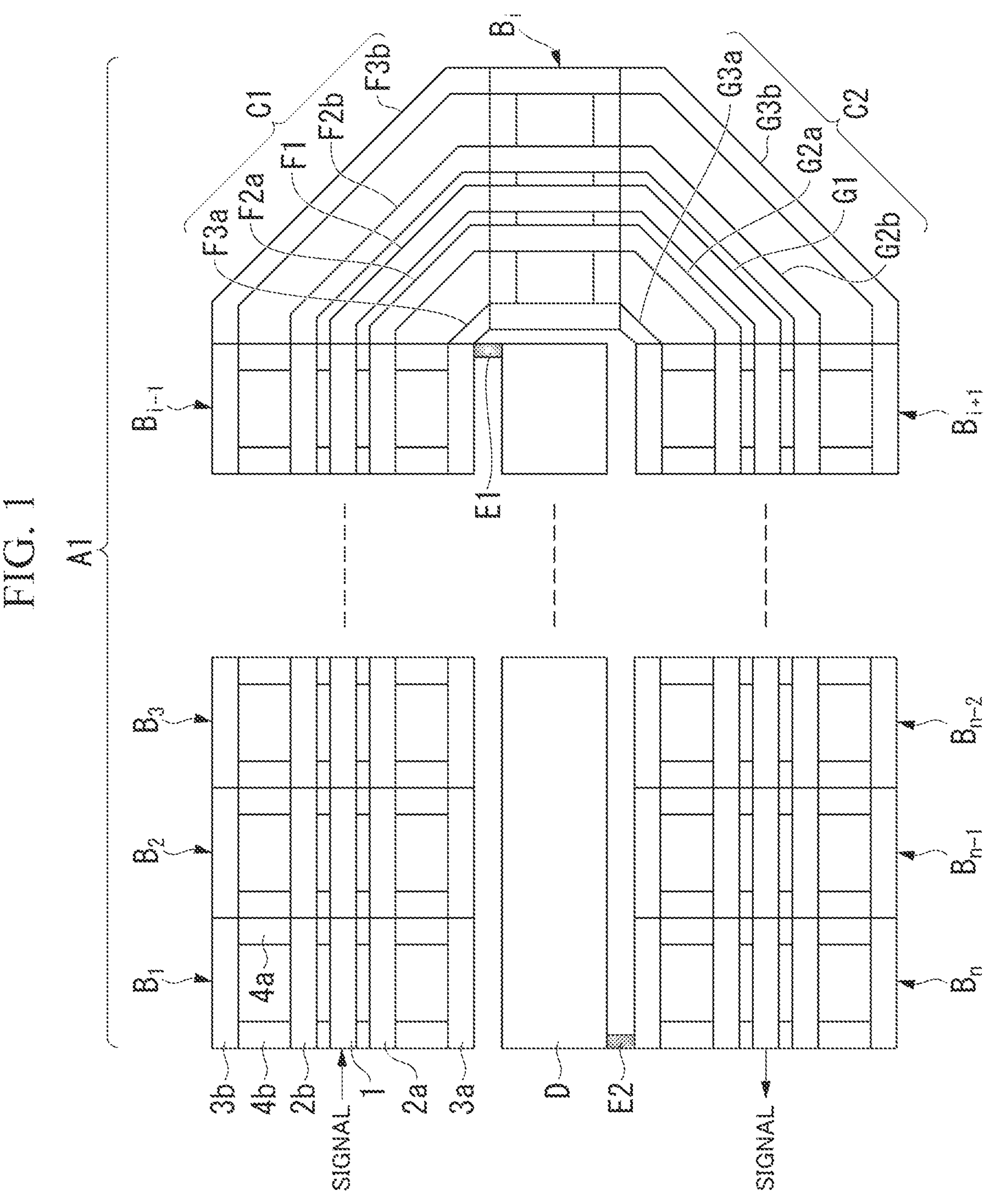
FIG. 1 is a plan view showing a configuration of a digital phase shifter A1 according to a first embodiment of the present invention.

First, a first embodiment of the present invention are described. As shown in FIG. 1, a digital phase shifter A1 according to the first embodiment is a high frequency circuit configured to output a high frequency signal with a phase shifted by a predetermined phase shift quantity to the outside using a signal (a high frequency signal) such as microwaves, sub-millimeter waves, millimeter waves, or the like, as an input.

As shown in FIG. 1, the digital phase shifter A1 includes a plurality of ("n") digital phase shift circuits B1 to Bn, a pair of connection circuits C1 and C2, a ground pattern D, and a pair of additional lines E1 and E2. Further, in the present embodiment, the above-mentioned "n" is a natural number. In addition, the following "i" is a natural number of 2 or more and "n" or less.

As shown in the drawings, the "n" (plurality of) digital phase shift circuits B1 to Bn are disposed in two rows (multiple rows) through the pair of connection circuits C1 and C2. That is, the digital phase shifter A1 according to the first embodiment includes a multi-row structure related to the digital phase shift circuits B1 to Bn using the pair of connection circuits C1 and C2. Further, a two-row structure shown in FIG. 1 is an example of the multi-row structure, and the number of rows may be three or more.

While described below in detail, as representatively shown in the digital phase shift circuit B1, each of the digital phase shift circuits B1 to Bn includes a signal line 1, two inner lines 2 (a first inner line 2*a* and a second inner line 2*b*), two outer lines 3 (a first outer line 3*a* and a second outer line 3*b*), two ground conductors 4 (a first ground conductor 4*a* and a second ground conductor 4*b*), and the like.

In the digital phase shifter A1, a transmission direction of a high frequency signal is a direction from a first digital phase shift circuit B1 toward an n-th digital phase shift circuit Bn. The first digital phase shift circuit B1 is positioned on the uppermost side (the foremost stage) in the transmission direction of the high frequency signal, and the n-th digital phase shift circuit Bn is located on the lowermost side (the final stage) in the transmission direction of the high frequency signal.

In the "n" digital phase shift circuits B1 to Bn, the first to ("i"−1)-th digital phase shift circuits B1 to B(i−1) constitute a front row (a first row), and are cascade-connected linearly. Meanwhile, the (i+1)-th to n-th digital phase shift circuits B(i+1) to Bn constitute a rear row (a second row), and are cascade-connected linearly. The front row (the first row) and the rear row (the second row) are provided substantially in parallel through the pair of connection circuits C1 and C2 and the i-th digital phase shift circuit B1.

In the first to (i−1)-th digital phase shift circuits B1 to B(i−1) of the front row (the first row), the signal lines 1 neighboring in the row direction (an extension direction of the front row and the rear row) are serially connected in a row. In addition, in the (i+1)-th to n-th digital phase shift circuits B(i+1) to Bn of the rear row (the second row), the signal lines 1 neighboring in the row direction are serially connected in a row.

In addition, in the first to (i−1)-th digital phase shift circuits B1 to B(i−1) of the front row (the first row), the first inner lines 2*a* neighboring in the row direction, the second inner lines 2*b* neighboring in the row direction, the first outer lines 3*a* neighboring in the row direction and the second outer lines 3*b* neighboring in the row direction are respectively serially connected in a row. In addition, in the (i+1)-th to n-th digital phase shift circuits B(i+1) to Bn of the rear row (the second row), the first inner lines 2*a* neighboring in the row direction, the second inner lines 2*b* neighboring in the row direction, the first outer lines 3*a* neighboring in the row direction and the second outer lines 3*b* neighboring in the row direction are respectively serially connected in a row.

In addition, in the first to (i−1)-th digital phase shift circuits B1 to B(i−1) of the front row (the first row), the first ground conductor 4*a* and the second ground conductor 4*b* neighboring in the row direction are connected to each other. In addition, in the (i+1)-th to n-th digital phase shift circuits B(i+1) to Bn of the rear row (the second row), the first ground conductor 4*a* and the second ground conductor 4*b* neighboring in the row direction are connected to each other. That is, in the first to (i−1)-th digital phase shift circuits B1 to B(i−1) of the front row (the first row), or in the (i+1)-th to n-th digital phase shift circuits B(i+1) to Bn of the rear row (the second row), the first ground conductor 4*a* of one digital phase shift circuit and the second ground conductor 4*b* of another digital phase shift circuit neighboring in the row direction are connected to each other.

The first to (i−1)-th digital phase shift circuits B1 to B(i−1) of the front row (the first row) and the (i+1)-th to n-th digital phase shift circuits B(i+1) to Bn of the rear row (the second row) have a neighboring relation between the rows. In the first to (i−1)-th digital phase shift circuits B1 to B(i−1) of the front row (the first row) and the (i+1)-th to n-th digital phase shift circuits B(i+1) to Bn of the rear row (the second row) having a relation neighboring between the rows, at least ones of the first outer lines 3*a* neighboring in an inter-row direction (a direction in which the front row and the rear row are adjacent to each other), the first ground conductor 4*a* and the second ground conductor 4*b* neighboring in an inter-row direction, and the second ground conductor 4*b* and the first ground conductor 4*a* neighboring in an inter-row direction are connected to each other through the ground pattern D.

That is, the ground pattern D connects at least ones of the first outer lines 3*a* neighboring in the inter-row direction, the first ground conductor 4*a* and the second ground conductor 4*b* neighboring in the inter-row direction, and the second ground conductor 4*b* and the first ground conductor 4*a* neighboring in the inter-row direction, which are electrically grounded. The digital phase shifter A1 including the ground pattern D includes an inter-row connection structure.

Here, in the digital phase shifter A1 according to the first embodiment, among the "n" digital phase shift circuits B1 to Bn, the i-th digital phase shift circuit B1 does not constitute the front row (the first row) and the rear row (the second row), and is disposed while being sandwiched between the pair of connection circuits C1 and C2. However, the i-th digital phase shift circuit B1 may be disposed to constitute the front row (the first row) or the rear row (the second row).

The pair of connection circuits C1 and C2 are circuits connected in a state in which the front row (the first row) and the rear row (the second row) are parallel to each other. In the pair of connection circuits C1 and C2, as shown in the drawings, the first connection circuit C1 connects the (i−1)-th digital phase shift circuit B(i−1) located on the final stage in the front row (the first row) and the i-th digital phase shift circuit B1. As shown in the drawings, the first connection circuit C1 includes five individual connection lines F1, F2*a*, F2*b*, F3*a* and F3*b*.

Among these individual connection lines F1, F2*a*, F2*b*, F3*a* and F3*b*, the first individual connection line F1 is a beltlike conductor that connects an output end (one end) of the signal line 1 in the (i−1)-th digital phase shift circuit B(i−1) and an input end (the other end) of the signal line 1 in the i-th digital phase shift circuit B1. The first individual connection line F1 is a long plate-shaped conductor having a fixed width, a fixed thickness and a predetermined length, and extends diagonally as shown in the drawings (when seen in a plan view shown in FIG. 1).

The second individual connection line F2*a* is a beltlike conductor configured to connect one end of the first inner line 2*a* in the (i−1)-th digital phase shift circuit B(i−1) and the other end of the first inner line 2*a* in the i-th digital phase shift circuit B1. The second individual connection line F2*a* is a long plate-shaped conductor having a fixed width, a fixed thickness and a predetermined length, and extends diagonally like the first individual connection line F1.

The third individual connection line F2*b* is a beltlike conductor configured to connect one end of the second inner line 2*b* in the (i−1)-th digital phase shift circuit B(i−1) and the other end of the second inner line 2*b* in the i-th digital phase shift circuit B1. The third individual connection line F2*b* is a long plate-shaped conductor having a fixed width, a fixed thickness and a predetermined length, and extends diagonally like the first individual connection line F1.

The fourth individual connection line F3*a* is a beltlike conductor configured to connect one end of the first outer line 3*a* in the (i−1)-th digital phase shift circuit B(i−1) and the other end of the first outer line 3*a* in the i-th digital phase shift circuit B1. The fourth individual connection line F3*a* is a long plate-shaped conductor having a fixed width, a fixed thickness and a predetermined length, and extends diagonally like the first individual connection line F1.

The fifth individual connection line F3*b* is a beltlike conductor configured to connect one end of the second outer line 3*b* in the (i−1)-th digital phase shift circuit B(i−1) and the other end of the second outer line 3*b* in the i-th digital phase shift circuit B1.

The fifth individual connection line F3*b* is a long plate-shaped conductor having a fixed width, a fixed thickness and a predetermined length, and extends diagonally like the first individual connection line F1.

Meanwhile, as shown in the drawings, the second connection circuit C2 connects the i-th digital phase shift circuit B1 and the (i+1)-th digital phase shift circuit B(i+1) located on the foremost stage in the rear row (the second row). As shown in the drawings, the second connection circuit C2 includes five individual connection lines G1, G2*a*, G2*b*, G3*a* and G3*b*.

Among these individual connection lines G1, G2*a*, G2*b*, G3*a* and G3*b*, the sixth individual connection line G1 is a beltlike conductor configured to connect an output end (one end) of the signal line 1 in the i-th digital phase shift circuit B1 and an input end (the other end) of the signal line 1 in the (i+1)-th digital phase shift circuit B(i+1). The sixth individual connection line G1 is a long plate-shaped conductor having a fixed width, a fixed thickness and a predetermined length, and extends diagonally as shown in the drawings (when seen in a plan view shown in FIG. 1).

The seventh individual connection line G2*a* is a beltlike conductor configured to connect one end of the first inner line 2*a* in the i-th digital phase shift circuit B1 and the other end of the first inner line 2*a* in the (i+1)-th digital phase shift circuit B(i+1). The seventh individual connection line G2*a* is a long plate-shaped conductor having a fixed width, a fixed thickness and a predetermined length, and extends diagonally like the sixth individual connection line G1.

The eighth individual connection line G2*b* is a beltlike conductor configured to connect one end of the second inner line 2*b* in the i-th digital phase shift circuit B1 and the other end of the second inner line 2*b* in the (i+1)-th digital phase shift circuit B(i+1). The eighth individual connection line G2*b* is a long plate-shaped conductor having a fixed width, a fixed thickness and a predetermined length, and extends diagonally like the sixth individual connection line G1.

The ninth individual connection line G3*a* is a beltlike conductor configured to connect one end of the first outer line 3*a* in the i-th digital phase shift circuit B1 and the other end of the first outer line 3*a* in the (i+1)-th digital phase shift circuit B(i+1). The ninth individual connection line G3*a* is a long plate-shaped conductor having a fixed width, a fixed thickness and a predetermined length, and extends diagonally like the sixth individual connection line G1.

The tenth individual connection line G3*b* is a beltlike conductor configured to connect one end of the second outer line 3*b* in the i-th digital phase shift circuit B1 and the other end of the second outer line 3*b* in the (i+1)-th digital phase shift circuit B(i+1). The tenth individual connection line G3*b* is a long plate-shaped conductor having a fixed width, a fixed thickness and a predetermined length, and extends diagonally like the sixth individual connection line G1.

The ground pattern D is positioned in a region between the front row (the first row) and the rear row (the second row), and a rectangular conductor provided along the extension direction of the front row (the first row) and the rear row (the second row). As shown in the drawings, the ground pattern D has a width slightly narrower than an interval between the front row (the first row) and the rear row (the second row). The ground pattern D is provided between the front row (the first row) and the rear row (the second row), for example, for a switch controller 8 described below.

While described below in detail, the digital phase shift circuits B1 to Bn are constituted by conductive layers. The ground pattern D is any one layer of the conductive layers. That is, the ground pattern D is provided on any one layer of the conductive layers that constitute the digital phase shift circuits B1 to Bn. However, the ground pattern D is not limited to any one layer of these conductive layers, and may be a conductive layer different from these conductive layers. That is, the ground pattern D may be provided on a conductive layer different from the conductive layers that constitute the digital phase shift circuits B1 to Bn.

The pair of additional lines E1 and E2 are conductors configured to connect the ground pattern D to the front row (the first row) and the rear row (the second row).

These additional lines E1 and E2 are substantially beltlike conductors having a predetermined width. The additional line E1 connects the front row (the first row) to the ground pattern D at one point, and the additional line E2 connects the rear row (the second row) to the ground pattern D at one point.

In these additional lines E1 and E2, the first additional line E1 connects a rear end of the front row (the first row) and the ground pattern D at one point by a shortest distance. That is, as shown in the drawings, the first additional line E1 connects one end of the first outer line 3*a* in the (i−1)-th digital phase shift circuit B(i−1) located on the final stage of the front row (the first row) to the ground pattern D.

Meanwhile, the second additional line E2 connects a rear end of the rear row (the second row) and the ground pattern D at one point by a shortest distance. That is, as shown in the drawings, the second additional line E2 connects one end of the first outer line 3*a* in the n-th digital phase shift circuit Bn located on the final stage of the rear row (the second row) to the ground pattern D.

Next, detailed configurations of the digital phase shift circuits B1 to Bn according to the first embodiment are described. As shown by representative reference sign B in FIG. 2, each of the digital phase shift circuits B1 to Bn includes a capacitor 5, connection conductors 6, four electronic switches 7 (a first electronic switch 7*a*, a second electronic switch 7*b*, third electronic switch 7*c* and a fourth electronic switch 7*d*) and the switch controller 8, in addition to the signal line 1, the pair of inner lines 2 (the first inner line 2*a* and the second inner line 2*b*), the pair of outer lines 3 (the first outer line 3*a* and the second outer line 3*b*), and the pair of ground conductors 4 (the first ground conductor 4*a* and the second ground conductor 4*b*).

Figure 2:
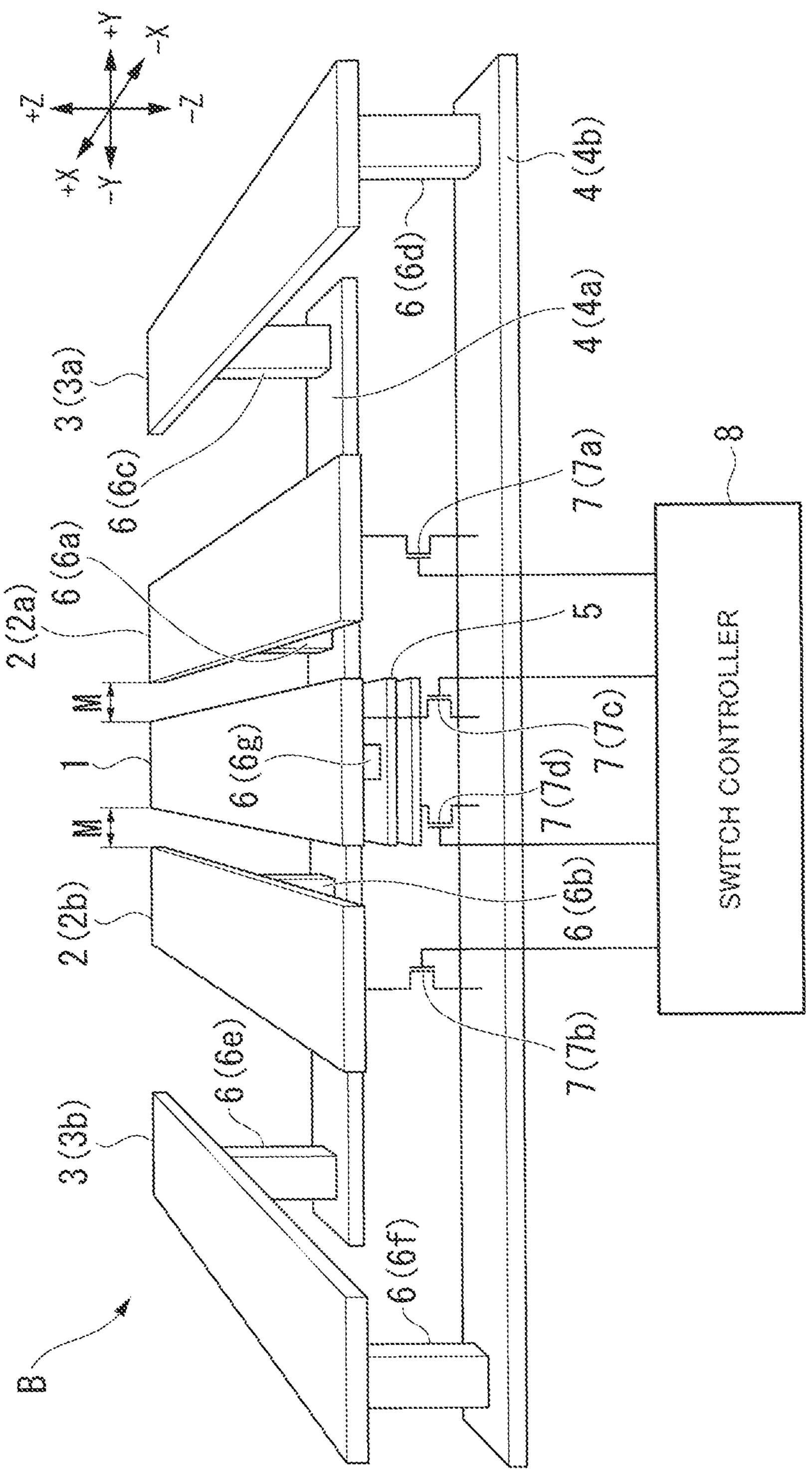
FIG. 2 is a conceptual view showing a functional configuration of a digital phase shift circuit B according to the first embodiment of the present invention.

The signal line 1 is a linear beltlike conductor extending in a predetermined direction. That is, the signal line 1 is a long plate-shaped conductor having a fixed width, a fixed thickness and a predetermined length. In FIG. 2, a high frequency signal flows through the signal line 1 from a front side toward a back side. The high frequency signal is a signal having a frequency band such as microwaves, sub-millimeter waves, millimeter waves, or the like.

Further, in FIG. 2, the forward/rearward direction of the digital phase shift circuit B is referred to as an X-axis direction, the leftward/rightward direction is referred to as a Y-axis direction, and the upward/downward direction (vertical direction) is referred to as a Z-axis direction. In addition, a +X direction is a direction from a front side toward a back side in the X-axis direction, and a −X direction is a direction directed opposite to the +X direction. A +Y direction is a direction directed rightward in the Y-axis direction, and a −Y direction is a direction directed opposite to the +Y direction. A +Z direction is a direction directed upward in the Z-axis direction, and a −Z direction is a direction directed opposite to the +Z direction.

The pair of inner lines 2 (the first inner line 2*a* and the second inner line 2*b*) are linear beltlike conductors provided on both sides of the signal line 1. The first inner line 2*a* is a long plate-shaped conductor having a fixed width, a fixed thickness and a predetermined length. The first inner line 2*a* extends in the same direction as the extension direction of the signal line 1. The first inner line 2*a* is provided parallel to the signal line 1 with separated by a predetermined distance M. Specifically, the first inner line 2*a* is disposed on one side of the signal line 1 with separated by the predetermined distance M. In other words, the first inner line 2*a* is disposed separated from the signal line 1 by the predetermined distance M in the +Y direction.

Like the first inner line 2*a*, the second inner line 2*b* has a long plate-shaped conductor having a fixed width, a fixed thickness and a predetermined length. The second inner line 2*b* extends in the same direction as the extension direction of the signal line 1. The second inner line 2*b* is provided parallel to the signal line 1 with separated by the predetermined distance M. Specifically, the second inner line 2*b* is disposed on the other side of the signal line 1 with separated by the predetermined distance M. In other words, the second inner line 2*b* is disposed separated from the signal line 1 by the predetermined distance M in the −Y direction.

The pair of outer lines 3 (the first outer line 3*a* and the second outer line 3*b*) are linear beltlike conductors provided on outer sides of the inner lines. The first outer line 3*a* is a linear beltlike conductor provided on one side of the signal line 1 at a position farther from the signal line 1 than the first inner line 2*a*.

That is, the first outer line 3*a* is a linear beltlike conductor disposed further in the +Y direction than the first inner line 2*a* (disposed spaced further apart from the signal line 1 than the first inner line 2*a* in the +Y direction). The first outer line 3*a* is a long plate-shaped conductor having a fixed width, a fixed thickness and a predetermined length. The first outer line 3*a* is provided parallel to the signal line 1 while being separated from the signal line 1 by a predetermined distance with the first inner line 2*a* sandwiched therebetween. Like the first inner line 2*a* and the second inner line 2*b*, the first outer line 3*a* extends in the same direction as the extension direction of the signal line 1.

The second outer line 3*b* is a linear beltlike conductor provided on the other side of the signal line 1 at a position farther from the signal line 1 than the second inner line 2*b*. That is, the second outer line 3*b* is a linear beltlike conductor disposed further in the −Y direction than the second inner line 2*b* (disposed spaced further apart from the signal line 1 than the second inner line 2*b* in the −Y direction). Like the first outer line 3*a*, the second outer line 3*b* is a long plate-shaped conductor having a fixed width, a fixed thickness and a predetermined length. The second outer line 3*b* is provided parallel to the signal line 1 while being separated from the signal line 1 by a predetermined distance with the second inner line 2*b* sandwiched therebetween. Like the first inner line 2*a* and the second inner line 2*b*, the second outer line 3*b* extends in the same direction as the extension direction of the signal line 1.

The first ground conductor 4*a* is a linear beltlike conductor provided on one end side of the first inner line 2*a*, the second inner line 2*b*, the first outer line 3*a* and the second outer line 3*b*. The first ground conductor 4*a* is electrically connected to one ends of the first inner line 2*a*, the second inner line 2*b*, the first outer line 3*a* and the second outer line 3*b*. The first ground conductor 4*a* is a long plate-shaped conductor having a fixed width, a fixed thickness and a predetermined length.

The first ground conductor 4*a* is provided perpendicular to the first inner line 2*a*, the second inner line 2*b*, the first outer line 3*a* and the second outer line 3*b* extending in the same direction. That is, the first ground conductor 4*a* is disposed to extend in the Y-axis direction. The first ground conductor 4*a* is provided below the first inner line 2*a*, the second inner line 2*b*, the first outer line 3*a* and the second outer line 3*b* with separated by a predetermined distance.

In the example shown in FIG. 2, the first ground conductor 4*a* is set such that one end that is an end in the +Y direction of the first ground conductor 4*a* is located at substantially the same position as a right side edge portion of the first outer line 3*a*. In the example shown in FIG. 2, the first ground conductor 4*a* is set such that the other end that is an end in the −Y direction of the first ground conductor 4*a* is located at substantially the same position as a left side edge portion of the second outer line 3*b*.

The second ground conductor 4*b* is a linear beltlike conductor provided on the other end side of the first inner line 2*a*, the second inner line 2*b*, the first outer line 3*a* and the second outer line 3*b*. Like the first ground conductor 4*a*, the second ground conductor 4*b* is a long plate-shaped conductor having a fixed width, a fixed thickness and a predetermined length.

The second ground conductor 4*b* is disposed parallel to the first ground conductor 4*a*, and like the first ground conductor 4*a*, provided perpendicular to the first inner line 2*a*, the second inner line 2*b*, the first outer line 3*a* and the second outer line 3*b*. The second ground conductor 4*b* is provided below the first inner line 2*a*, the second inner line 2*b*, the first outer line 3*a* and the second outer line 3*b* with separated by a predetermined distance.

The second ground conductor 4*b* is provided such that one end that is an end in the +Y direction of the second ground conductor 4*b* is located at substantially the same position as a right side edge portion of the first outer line 3*a*. The second ground conductor 4*b* is set such that the other end that is an end in the −Y direction of the second ground conductor 4*b* is located at substantially the same position as a left side edge portion of the second outer line 3*b*. In FIG. 2, the second ground conductor 4*b* is located at the same position as the first ground conductor 4*a* in the Y-axis direction.

The capacitor 5 is provided between the signal line 1 and the first ground conductor 4*a* or the second ground conductor 4*b*. For example, the capacitor 5 includes an upper electrode connected to the signal line 1 and a lower electrode electrically connected to the fourth electronic switch 7*d*. For example, the capacitor 5 is a thin film capacitor formed in a metal insulator metal (MIM) structure. Further, the capacitor 5 may be a parallel plate type capacitor or may be an opposite comb type capacitor (an interdigital capacitor).

The connection conductors 6 include at least the connection conductors 6*a* to 6*i*. The connection conductor 6*a* is a conductor configured to electrically and mechanically connect one end of the first inner line 2*a* and the first ground conductor 4*a*. For example, the connection conductor 6*a* is a conductor extending in the Z-axis direction, and has one end (an upper end) connected to a lower surface of the first inner line 2*a* and the other end (a lower end) connected to an upper surface of the first ground conductor 4*a*.

The connection conductor 6*b* is a conductor configured to electrically and mechanically connect one end of the second inner line 2*b* and the first ground conductor 4*a*. For example, the connection conductor 6*b* is a conductor extending in the Z-axis direction like the connection conductor 6*a*, and has one end (an upper end) connected to a lower surface of the second inner line 2*b* and the other end (a lower end) connected to an upper surface of the first ground conductor 4*a*.

The connection conductor 6*c* is a conductor configured to electrically and mechanically connect one end of the first outer line 3*a* and the first ground conductor 4*a*. For example, the connection conductor 6*c* is a conductor extending in the Z-axis direction, and has one end (an upper end) connected to a lower surface in one end of the first outer line 3*a* and the other end (a lower end) connected to an upper surface of the first ground conductor 4*a*.

The connection conductor 6*d* is a conductor configured to electrically and mechanically connect the other end of the first outer line 3*a* and the second ground conductor 4*b*. For example, the connection conductor 6*d* is a conductor extending in the Z-axis direction, and has one end (an upper end) connected to a lower surface in the other end of the first outer line 3*a* and the other end (a lower end) connected to an upper surface of the second ground conductor 4*b*.

The connection conductor 6*e* is a conductor configured to electrically and mechanically connect one end of the second outer line 3*b* and the first ground conductor 4*a*. For example, the connection conductor 6*e* is a conductor extending in the Z-axis direction, and has one end (an upper end) connected to a lower surface in one end of the second outer line 3*b* and the other end (a lower end) connected to an upper surface of the first ground conductor 4*a*.

The connection conductor 6*f* is a conductor configured to electrically and mechanically connect the other end of the second outer line 3*b* and the second ground conductor 4*b*. For example, the connection conductor 6*f* is a conductor extending in the Z-axis direction, and has one end (an upper end) connected to a lower surface in the other end of the second outer line 3*b* and the other end (a lower end) connected to an upper surface of the second ground conductor 4*b*.

The connection conductor 6*g* is a conductor configured to electrically and mechanically connect the other end of the signal line 1 and the upper electrode of the capacitor 5. For example, the connection conductor 6*g* is a conductor extending in the Z-axis direction, and has one end (an upper end) connected to a lower surface in the other end of the signal line 1 and the other end (a lower end) connected to the upper electrode of the capacitor 5.

The first electronic switch 7*a* is connected to the other end of the first inner line 2*a* and the second ground conductor 4*b* therebetween. The first electronic switch 7*a* is, for example, a metal oxide semiconductor field effect transistor (MOSFET), and includes a drain terminal electrically connected to the other end of the first inner line 2*a*, a source terminal electrically connected to the second ground conductor 4*b* and a gate terminal electrically connected to the switch controller 8.

The first electronic switch 7*a* is controlled to a closed state or an open state based on the gate signal input to the gate terminal from the switch controller 8. The closed state is a state in which the drain terminal and the source terminal are conducted.

The open state is a state in which the drain terminal and the source terminal are not conducted and the electrical connection thereof is disconnected. The first electronic switch 7*a* is switched to a conduction state in which the other end of the first inner line 2*a* and the second ground conductor 4*b* are electrically connected or a disconnection state in which the electrical connection therebetween is disconnected under control of the switch controller 8.

The second electronic switch 7*b* is connected to the other end of the second inner line 2*b* and the second ground conductor 4*b* therebetween. The second electronic switch 7*b* is, for example, a MOSFET, and includes a drain terminal connected to the other end of the second inner line 2*b*, a source terminal connected to the second ground conductor 4*b* and a gate terminal connected to the switch controller 8.

The second electronic switch 7*b* is controlled to a closed state or an open state based on the gate signal input to the gate terminal from the switch controller 8. The second electronic switch 7*b* is switched to a conduction state in which the other end of the second inner line 2*b* and the second ground conductor 4*b* are electrically connected or a disconnection state in which the electrical connection therebetween is disconnected under control of the switch controller 8.

The third electronic switch 7*c* is connected to the other end of the signal line 1 and the second ground conductor 4*b* therebetween. The third electronic switch 7*c* is, for example, a MOSFET, and includes a drain terminal connected to the other end of the signal line 1, a source terminal connected to the second ground conductor 4*b* and a gate terminal connected to the switch controller 8. Further, as shown in FIG. 2, while the third electronic switch 7*c* is provided on the other end side of the signal line 1, it is not limited thereto and may be provided on one end side of the signal line 1.

The third electronic switch 7*c* is controlled to a closed state or an open state based on the gate signal input to the gate terminal from the switch controller 8. The third electronic switch 7*c* is switched to a conduction state in which the other end of the signal line 1 and the second ground conductor 4*b* are electrically connected or a disconnection state in which the electrical connection therebetween is disconnected under control of the switch controller 8.

The fourth electronic switch 7*d* is an electronic switch for a capacitor serially connected to the capacitor 5 between the other end of the signal line 1 and the second ground conductor 4*b*. The fourth electronic switch 7*d* is, for example, a MOSFET. As shown in FIG. 2, the fourth electronic switch 7*d* includes a drain terminal connected to a lower electrode of the capacitor 5, a source terminal connected to the second ground conductor 4*b* and a gate terminal connected to the switch controller 8.

The fourth electronic switch 7*d* is controlled to a closed state or an open state based on the gate signal input to the gate terminal from the switch controller 8. The fourth electronic switch 7*d* is switched to a conduction state in which the lower electrode of the capacitor 5 and the second ground conductor 4*b* are electrically connected or a disconnection state in which the electrical connection therebetween is disconnected under control of the switch controller 8.

The switch controller 8 is a control circuit configured to control the first electronic switch 7*a*, the second electronic switch 7*b*, the third electronic switch 7*c* and the fourth electronic switch 7*d*, which are the electronic switches 7. For example, the switch controller 8 includes four output ports. The switch controller 8 individually controls the electronic switches 7 to an open state or a closed state by outputting individual gate signals from the individual output ports and supplying the signals to the individual gate terminals of the electronic switches 7.

Here, while FIG. 2 shows a schematic perspective view of the digital phase shift circuit B so that a mechanical structure of the digital phase shift circuit B can be easily understood, the actual digital phase shift circuit B is a multilayer structure using a semiconductor manufacturing technology. For example, the digital phase shift circuit B includes the signal line 1, the first inner line 2*a*, the second inner line 2*b*, the first outer line 3*a* and the second outer line 3*b*, which are formed on the first conductive layer. In addition, the first ground conductor 4*a* and the second ground conductor 4*b* are formed on the second conductive layers facing the first conductive layer with the insulating layer sandwiched therebetween. The components formed on the first conductive layer and the components formed on the second conductive layers are connected to each other by via holes (via-holes). In addition, the connection conductors 6 correspond to the via holes embedded in the insulating layer.

Figure 3:
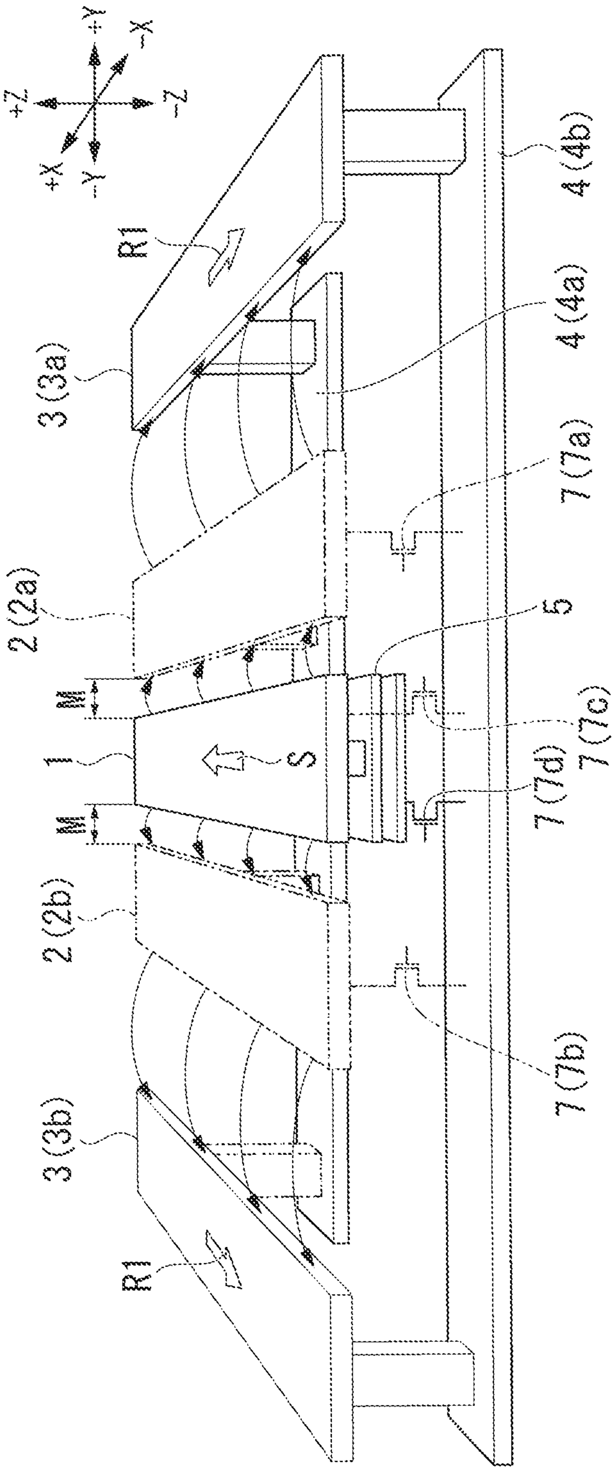
FIG. 3 is a schematic view showing a conduction route of a return current upon a high delay mode in the digital phase shift circuit B according to the first embodiment of the present invention.

Next, an operation of the digital phase shift circuit B having the above-mentioned configuration are described with reference to FIG. 3 and FIG. 4. The digital phase shift circuit B has a high delay mode and a low delay mode as operation modes, which are described below. That is, the digital phase shift circuit B is operated in the high delay mode or the low delay mode by being controlled by the switch controller 8.

[High Delay Mode]

The high delay mode is a mode in which a first phase difference is generated in a high frequency signal S. As shown in FIG. 3, in the high delay mode, the first electronic switch 7*a* and the second electronic switch 7*b* are controlled to the open state, and the fourth electronic switch 7*d* is controlled to the closed state.

When the first electronic switch 7*a* is controlled to the open state, electrical connection between the other end of the first inner line 2*a* and the second ground conductor 4*b* is disconnected. When the second electronic switch 7*b* is controlled to the open state, connection between the other end of the second inner line 2*b* and the second ground conductor 4*b* of the multilayer structure is disconnected. When the fourth electronic switch 7*d* is controlled to the closed state, the other end of the signal line 1 is connected to the second ground conductor 4*b* through the capacitor 5.

When the high frequency signal S is propagated through the signal line 1 from the input end (the other end) toward the output end (one end), a return current R1 flows from one end toward the other end in a direction opposite to the high frequency signal S (opposite to a direction in which the high frequency signal S propagates). That is, the return current R1 is a current flowing in the −X direction that is a direction opposite to the high frequency signal S flowing in the +X direction. In the high delay mode, since the first electronic switch 7*a* and the second electronic switch 7*b* are in the open state, as shown in FIG. 3, the return current R1 mainly flows through the first outer line 3*a* and the second outer line 3*b* in the −X direction.

In the high delay mode, since the return current R1 flows through the first outer line 3*a* and the second outer line 3*b*, an inductance value L is higher than that in the low delay mode. In addition, since the fourth electronic switch 7*d* is in the closed state, the capacitor 5 is working. For this reason, in the high delay mode, a delay quantity greater than that in the low delay mode can be obtained.

[Low Delay Mode]

The low delay mode is a mode in which a second phase difference smaller than the first phase difference is generated in the high frequency signal S. In the low delay mode, as shown in FIG. 4, the first electronic switch 7*a* and the second electronic switch 7*b* are controlled to the closed state, and the fourth electronic switch 7*d* is controlled to the open state.

When the first electronic switch 7*a* is controlled to the closed state, the other end of the first inner line 2*a* and the second ground conductor 4*b* are electrically connected. When the second electronic switch 7*b* is controlled to the closed state, the other end of the second inner line 2*b* and the second ground conductor 4*b* are electrically connected.

Figure 4:
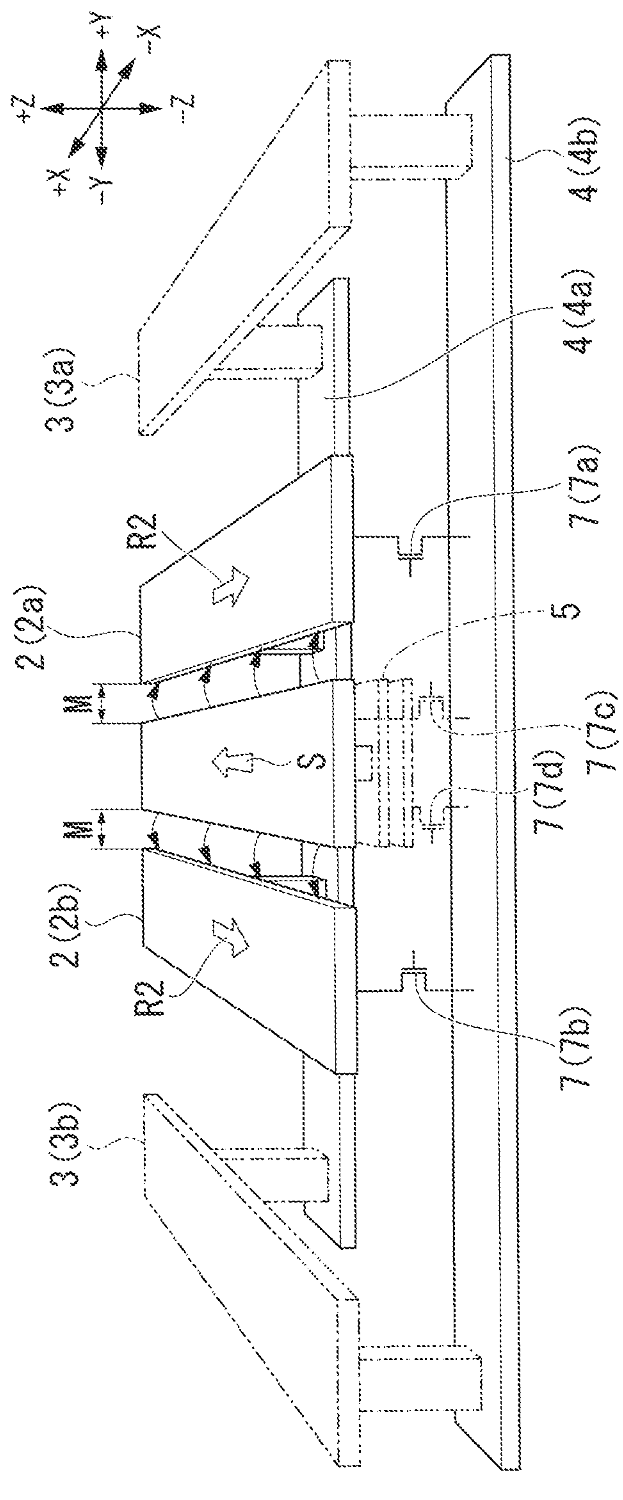
FIG. 4 is a schematic view showing a conduction route of a return current upon a low delay mode in the digital phase shift circuit B according to the first embodiment of the present invention.

In the low delay mode, since the first electronic switch 7*a* and the second electronic switch 7*b* are in the closed state, as shown in FIG. 4, a return current R2 mainly flows through the first inner line 2*a* and the second inner line 2*b* in the −X direction. In the low delay mode, since the return current R2 flows through the first inner line 2*a* and the second inner line 2*b*, the inductance value L is lower than that in the high delay mode. In addition, since the fourth electronic switch 7*d* is in the open state, the capacitor 5 is not working. For this reason, a capacitance value C is smaller than that in the high delay mode. For this reason, a delay quantity in the low delay mode is lower than a delay quantity in the high delay mode.

Next, characteristic effects of the digital phase shifter A1 according to the first embodiment are described with reference to FIG. 1.

In the digital phase shifter A1, as described above, the ground pattern D provided between the front row (the first row) and the rear row (the second row) is connected to the front row (the first row) by the additional line E1 at one point and connected to the rear row (the second row) by the additional line E2 at one point.

In addition, each of the one points is one end of the first outer line 3*a* in the (i−1)-th digital phase shift circuit B(i−1) located on the final stage in the front row (the first row), and one end of the first outer line 3*a* in the n-th digital phase shift circuit Bn located on the final stage in the rear row (the second row). That is, a connection point (a first connection point) to the ground pattern D in the front row (the first row) and a connection point (a second connection point) to the ground pattern D in the rear row (the second row) are located in an area in the vicinity of one diagonal line in the rectangular ground pattern D as shown in FIG. 1. That is, the first connection point and the second connection point are located in an area in the vicinity of both ends of one diagonal line of a pair of diagonal line in the rectangular ground pattern D. The first connection point and the second connection point correspond to the farthest positions in the ground pattern D, According to the digital phase shifter A1, since the ground pattern D is connected to the front row (the first row) by the first connection point at one point and connected to the rear row (the second row) by the second connection point at one point, and the first connection point and the second connection point are separated from each other, reduction in phase shift quantity in the first to (i−1)-th digital phase shift circuits B1 to B(i−1) and the (i+1)-th to n-th digital phase shift circuits B(i+1) to Bn due to connection of the ground pattern D to the front row (the first row) and the rear row (the second row) can be suppressed.

Second Embodiment

Figure 5:
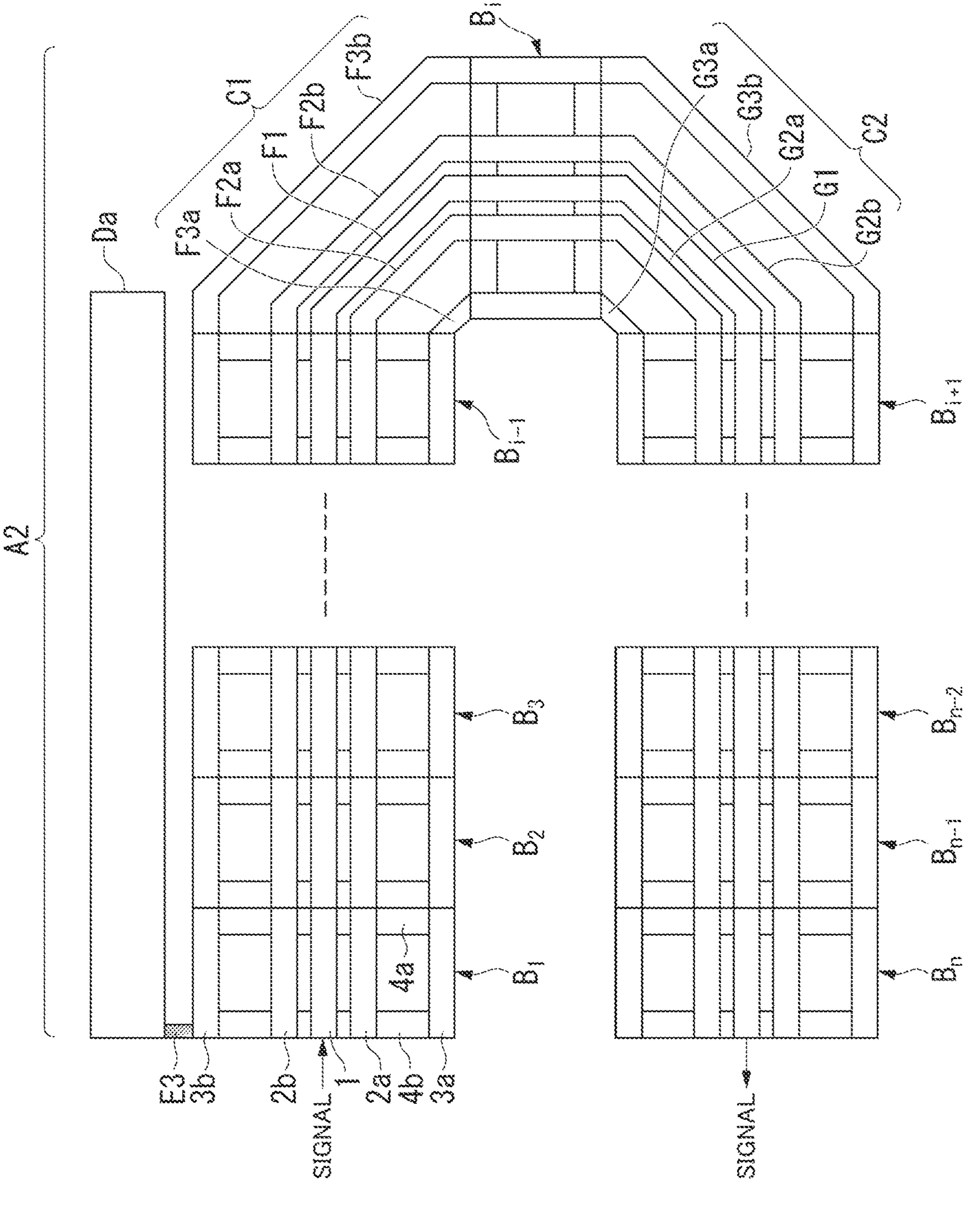
FIG. 5 is a plan view showing a configuration of a digital phase shifter A2 according to a second embodiment of the present invention.

Next, a second embodiment of the present invention are described with reference to FIG. 5.

While the digital phase shifter A1 according to the first embodiment includes the ground pattern D between the front row (the first row) and the rear row (the second row), i.e., inside the front row (the first row), the digital phase shifter A2 according to the second embodiment includes the ground pattern Da outside the front row (the first row) as shown in the drawings.

In addition, the digital phase shifter A2 includes an additional line E3 configured to connect the front row (the first row) and the ground pattern Da at one point. As shown in the drawings, the additional line E3 is a substantially beltlike conductor configured to connect an area in the vicinity of the other end of the second outer line 3*b* in the first digital phase shift circuit B1, i.e., the front end of the front row (the first row) and the ground pattern Da at one point by the shortest distance.

According to the digital phase shifter A2, since the front row (the first row) and the ground pattern Da are connected by the additional line E3 at one point, it is possible to minimize the influence on the phase shift characteristics due to connection of the ground pattern Da. That is, according to the second embodiment, it is possible to provide the digital phase shifter A2 capable of suppressing reduction in phase shift quantity of the digital phase shift circuit due to connection of the ground pattern Da.

Further, the digital phase shifter A1 according to the first embodiment and the digital phase shifter A2 according to the second embodiment include a two-row structure in which the number of rows is two as an example of the multi-row structure. However, the present invention is not limited thereto and can also be applied to a digital phase shifter including a structure with three rows or more, in which the number of rows is three or more.

REFERENCE SIGNS

A1, A2 Digital phase shifter
B, B1 to Bn Digital phase shift circuit
C1, C2 Connection circuit
D, Da Ground pattern
E1, E2, E3 Additional line
1 Signal line
2 Inner line
2*a* First inner line
2*b* Second inner line
3 Outer line
3*a* First outer line
3*b* Second outer line
4 Ground conductor
4*a* First ground conductor
4*b* Second ground conductor
5 Capacitor
6 Connection conductor
7 Electronic switch
7*a* First electronic switch
7*b* Second electronic switch
7*c* Third electronic switch
7*d* Fourth electronic switch (electronic switch for capacitor)
8 Switch controller

The invention claimed is:

1. A digital phase shifter in which digital phase shift circuits are cascade-connected, each of the digital phase shift circuits including at least a signal line, a pair of inner lines provided on both sides of the signal line, a pair of outer lines provided on outer sides of the inner lines, a first ground conductor connected to one ends of the inner lines and one ends of the outer lines, a second ground conductor connected to the other ends of the outer lines, and a pair of electronic switches provided between the other ends of the inner lines and the second ground conductor, wherein the digital phase shift circuits include a multi-row structure constituted by a front row and a rear row connected through a predetermined connection circuit, and also include a structure in which the front row and the rear row are adjacent to each other, and one outer line of the pair of outer lines in the front row is connected to a predetermined ground pattern, and the ground pattern is connected to the front row at one point.

2. The digital phase shifter according to claim 1, wherein the ground pattern is connected to a front end of the front row.

3. The digital phase shifter according to claim 1, wherein the ground pattern is positioned in a region between the front row and the rear row adjacent to each other, and the ground pattern is connected to a rear end of the front row at the one point.

4. The digital phase shifter according to claim 1, wherein the digital phase shift circuit is constituted by conductive layers, and the ground pattern is one layer of the conductive layers.

5. The digital phase shifter according to claim 1, wherein the digital phase shift circuit is constituted by conductive layers, and the ground pattern is a conductive layer different from the conductive layers.

6. The digital phase shifter according to claim 1, wherein the digital phase shift circuit includes a capacitor including an upper electrode connected to the signal line and a lower electrode connected to at least one of the first ground conductor and the second ground conductor.

7. The digital phase shifter according to claim 6, wherein the digital phase shift circuit further includes an electronic switch for the capacitor between the lower electrode of the capacitor and at least one of the first ground conductor and the second ground conductor.

* * * * *